United States Patent [19]

Simmons et al.

[11] 3,852,309

[45] Dec. 3, 1974

[54] ORGANIC SOLVENT SOLUBLE METAL ALUMINATES

[75] Inventors: Todd S. Simmons, Montclair; Rudolph H. Trinks, Union; Jaroslav Vit, Belle Meade, all of N.J.

[73] Assignee: National Patent Development Corporation, New York, N.Y.

[22] Filed: Nov. 24, 1970

[21] Appl. No.: 92,526

[52] U.S. Cl..... 260/347.7, 260/347.8, 260/448 AD, 252/431
[51] Int. Cl............................ C07d 5/16, C07f 5/06
[58] Field of Search........ 260/347.8, 347.7, 448 AD

[56] References Cited
UNITED STATES PATENTS

| | | | |
|---|---|---|---|
| 1,689,356 | 10/1928 | Meerwein | 260/448 |
| 3,394,158 | 7/1968 | Chini et al. | 260/448 |
| 3,507,895 | 4/1970 | Casensky et al. | 260/448 |

OTHER PUBLICATIONS

Chem. Abstracts vol. 24. page 586–7(1930) Meerwein et al.

Primary Examiner—Henry R. Jiles
Assistant Examiner—Bernard I. Dentz
Attorney, Agent, or Firm—Cushman, Darby & Cushman

[57] ABSTRACT

Compounds are prepared having one of the formulae: $MAlZ_4$, $Me_3AlZ_6$, and $M'[Al(Z_4)]_2$ where M is sodium, potassium or lithium, Me is sodium or potassium, M' is calcium, strontium or barium, Z is $-O(C_nH_{2n}O)_xR$,

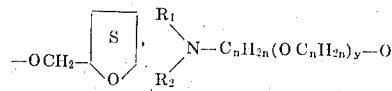

or

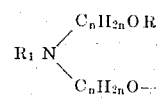

where R is lower alkyl or tetrahydrofurfuryl, $R_1$ and $R_2$ are lower alkyl, $n$ is an integer from 2 to 4, $x$ is an integer from 1 to 4, $y$ is an integer from 0 to 4. The compounds can be used as catalysts for organic chemical reactions.

26 Claims, No Drawings

ORGANIC SOLVENT SOLUBLE METAL ALUMINATES

The present invention relates to novel organic solvent soluble metal aluminates.

There are many metal alkoxides used as base catalysts in organic chemistry. The common catalysts sodium methylate ($NaOCH_3$) and sodium ethylate ($NaOC_2H_5$) suffer the disadvantage of not being soluble except in alcoholic media. The higher alkoxides, due to their low reactivity are difficult to prepare free of alcohol.

It is, therefore, an object of the present invention to prepare base catalysts free from these difficulties and suitable for catalyzing organic reactions.

Another object is to provide novel organic group substituted metal aluminates which are very soluble in organic solvents.

A more specific object is to prepare such aluminates which are soluble in hydrocarbons, and especially in aromatic hydrocarbons.

A further object is to develop a method of making such aluminates, which method is simple and economically attractive.

Yet another object is to develop such a method which gives a product free of any organic material which contains active hydrogen.

Still further objects and the entire scope of applicability of the present invention will become apparent from the detailed description given hereinafter; it should be understood, however, that the detailed description and specific example, while indicating preferred embodiments of the invention, are given by way of illustration only, since various changes and modifications within the spirit and scope of the invention will become apparent to those skilled in the art from this detailed description.

It has now been found that these objects can be attained by preparing compounds having one of the formulae:

$$MAlZ_4, MeAlZ_6 \text{ and } M'[Al(Z_4)]_2$$
$$\text{I} \quad \text{II} \quad \text{III}$$

where M is sodium, potassium or lithium, Me is sodium or potassium and M' is calcium, strontium or barium, Z is $-O(C_nH_{2n}O)_xR$,

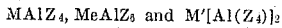, $-O-(C_nH_{2n}O)_y-C_nH_{2n}N\begin{matrix}R_1\\ \\R_2\end{matrix}$ or

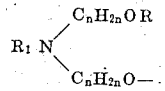

where R is lower alkyl, e.g. one to four carbon atoms, or tetrahydrofurfuryl, $R_1$ and $R_2$ are lower alkyl, e.g. one to four carbon atoms, $n$ is an integer from 2 to 4, $x$ is an integer from 1 to 4 and $y$ is an integer from 0 to 4.

The preferred compounds have formula II, the most preferred compounds are trisodium hexa (methoxyethyl) aluminate ( $Na_3Al(OCH_2CH_2OCH_3)_6$ ) and trisodium hexa (dimethylaminoethyl) aluminate, and calcium di(tetramethoxyethyl) aluminate.

Examples of compounds within the invention, in addition to the three mentioned above, include sodium tetra (methoxyethyl) aluminate, potassium tetra (methoxyethyl) aluminate, lithium tetra (methoxyethyl) aluminate, sodium tetra (ethoxyethyl) aluminate, sodium tetra (propoxyethyl) aluminate, sodium tetra (methoxyethoxyethyl) aluminate, sodium tetra (ethoxyethosyethyl) aluminate, potassium tetra (ethoxyethoxyethyl) aluminate, lithium tetra (methoxyethoxyethyl) aluminate, sodium tetra (methoxypropyl) aluminate, sodium tetra (methoxybutyl) aluminate, potassium tetra (methoxybutyl) aluminate, lithium tetra (ethoxypropyl) aluminate, sodium tetra (methoxyethoxyethoxyethoxyethyl) aluminate, sodium di(methoxyethyl) di(ethoxyethyl) aluminate, sodium tetra(tetrahydrofurfuroxyethyl) aluminate, potassium tetra (tetrahydrofurfuroxyethoxyethyl) aluminate, sodium tetra (tetrahydrofurfuroxypropyl) aluminate, sodium tetra (dimethylaminoethyl) aluminate, sodium tetra (methyl ethyl aminoethyl) aluminate, potassium tetra (dimethylaminoethyl) aluminate, lithium tetra (dimethylaminoethyl) aluminate, sodium tetra (dipropylaminoethyl) aluminate, sodium tetra (dibutylaminoethyl) aluminate, potassium tetra (dimethylaminopropyl) aluminate, sodium tetra (diethylaminobutyl)aluminate, sodium tetra (dimethylaminoethoxyethyl) aluminate, sodium tetra (dimethylaminopropoxyethyl) aluminate, potassium tetra (dimethylaminobutoxypropyl) aluminate, lithium tetra (diethylaminoethoxybutyl) aluminate, sodium tetra (tetrahydrofurfuryl) aluminate, potassium tetra (tetrahydrofurfuryl) aluminate, lithium tetra (tetrahydrofurfuryl) aluminate, sodium tetra (methoxyethyl methylaminoethyl) aluminate

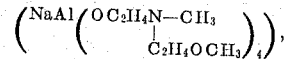

sodium tetra (ethoxyethyl methylaminoethyl) aluminate, sodium tetra (methoxyethylethylaminoethyl) aluminate, potassium tetra (methoxypropyl methylaminopropyl) aluminate, tripotassium hexa (methoxyethyl) aluminate, trisodium hexa (ethoxyethyl) aluminate, trisodium hexa (propoxyethyl) aluminate, trisodium hexa (isopropoxyethyl) aluminate, trisodium hexa (butoxyethyl) aluminate, tripotassium hexa (sec. butoxyethyl) aluminate, trisodium hexa (methoxypropyl) aluminate, trisodium hexa (methoxybutyl) aluminate, tripotassium hexa (methoxypropyl) aluminate, trisodium hexa (ethoxypropyl) aluminate, trisodium hexa (methoxyethoxyethyl) aluminate, trisodium hexa (methoxyethoxyethyl) aluminate, trisodium hexa (methoxyethoxyethoxyethyl) aluminate, tripotassium (propoxyethoxypropyl) aluminate, trisodium hexa (tetrahydrofurfuryl) aluminate, trisodium hexa (tetrahydrofurfuryloxyethyl) aluminate, tripotassium hexa (tetrahydrofurfuryl) aluminate, trisodium hexa (tetrahydrofurfuryloxypropyl) aluminate, trisodium hexa (tetrahydrofurfuryloxyethoxyethyl) aluminate, tripotassium hexa (dimethylaminoethyl) aluminate, trisodium hexa (diethylaminoethyl) aluminate, tripotassium hexa (methyl ethyl aminoethyl) aluminate, trisodium hexa (dipropylaminoethyl) aluminate, trisodium hexa (dibutylaminoethyl) aluminate, trisodium hexa (dimethylaminoethoxyethyl) aluminate, trisodium hexa (dimethylaminoethoxyethoxyethyl) aluminate, trisodium hexa (diethylaminopropoxyethyl) aluminate, trisodium hexa (dimethylaminopropyl) aluminate, trisodium hexa (diethylaminobutyl) aluminate, trisodium hexa (methoxyethyl methylaminoethyl) aluminate, trisodium hexa (ethoxyethyl methylaminoethyl) aluminate, tripotassium hexa (methoxyethyl ethylaminoethyl) aluminate, trisodium hexa (methoxypropyl methylaminopropyl) aluminate, strontium di(tetra(methoxyethyl) aluminate), barium di(tetra(methoxyethyl) aluminate), calcium di(tetra(ethoxyethyl) aluminate), strontium di(tetra(ethoxyethyl) aluminate), barium di(tetra (ethoxyethyl) aluminate), calcium di(tetra(propoxyethyl) aluminate), barium di(tetra(propoxyethyl) aluminate, strontium di(tetra(isopropoxyethyl) aluminate), calcium di(tetra(butoxyethyl) aluminate), barium di(tetra(sec. butoxyethyl) aluminate), calcium di(tetra(methoxypropyl) aluminate), strontium di(tetra(methoxybutyl) aluminate), barium (di(tetra (ethoxypropyl) aluminate), calcium di(tetra(methoxyethoxyethyl) aluminate), barium di(tetra(methoxyethoxyethoxyethyl) aluminate), calcium di(tetra(methoxyethoxyethoxyethyl) aluminate), strontium di(tetra(propoxyethoxypropyl) aluminate), calcium di(tetra(tetrahydrofurfuryl) aluminate), strontium di(tetra(tetrahydrofurfuryl) aluminate), barium di(tetra (tetrahydrofurfuryl) aluminate), calcium di(tetra(tetrahydrofurfuryloxyethyl) aluminate), barium di(tetra (tetrahydrofurfuryloxypropyl) aluminate), calcium di(tetra (tetrahydrofurfuryloxyethoxyethyl) aluminate), calcium di(tetra(dimethylaminoethyl) aluminate), barium di(tetra (dimethylaminoethyl) aluminate), strontium di(tetra(dimethylaminoethyl) aluminate), calcium di(tetra(diethylaminoethyl) aluminate), barium di(tetra (diethylaminoethyl) aluminate), calcium di(tetra (methyl ethyl aminoethyl) aluminate), calcium di(tetra(dipropylaminoethyl) aluminate), barium di(tetra(dibutylaminoethyl) aluminate), calcium di(tetra(dimethylaminoethoxyethyl) aluminate), stortium di(tetra (dimethylaminoethoxyethoxyethyl) strontium calcium di(tetra (diethylaminopropoxyethyl) aluminate), barium di(tetra(dimethylaminopropyl) aluminate, calcium di(tetra(diethylaminobutyl) aluminate), calcium di(tetra(methoxyethyl methylaminoethyl) aluminate), barium di(tetra(ethoxyethylmethylaminoethyl) aluminate), strontium di(tetra(methoxyethyl ethylaminoethyl) aluminate), calcium di(tetra(methoxypropyl methylaminopropyl) aluminate).

The compounds of the present invention are soluble in liquid aromatic and aliphatic hydrocarbon solvents, e.g. benzene, toluene, xylene (the three individual isomers thereof, alone or in admixture with each other or other solvents), hexane, octane, aromatic naphtha, mineral spirits, cyclohexane, ethers, e.g. diethyl ether, tetrahydrofurane, dioxolane, dioxane, dipropyl ether, ethylene glycol di-methyl ether, or chlorinated hydrocarbons, e.g. chloroform, dichloroethylene, trichloroethylene, etc. The compounds can be used as basic catalysts in solution in an amount up to the solubility in the solvent. The compound is usually employed in aromatic hydrocarbon or other solvent solution in an amount of about 5 to 40 percent by weight or even up to 80 percent by weight when solubility permits. in benzene, for example, trisodium hexa (methoxyethyl) aluminate is used in an amount up to 38 percent by weight or higher.

In contrast to the basic compounds of the present invention, simple alcohol type alkali or alkaline earth metal aluminates, e.g. trisodium hexa (methyl) aluminate and sodium tetramethyl aluminate are insoluble in hydrocarbon solvents. The hydrocarbon solubility of the compounds of the present invention greatly increases their utility as basic reagents.

The organic hydrocarbon solvent soluble metal aluminates of the present invention can be prepared, for example, by following the procedures as set forth in the following nine equations:

(1) $M + Al + 4ZH \rightarrow MAl(Z)_4 + 2H_2$
(2) $3Me + Al + 6ZH \rightarrow Me_3Al(Z)_6 + 3H_2$
(3) $M' + 2Al + 8ZH \rightarrow M'[Al(Z)_4]_2 + 4H_2$
(4) $M + AlZ_3 + ZH \rightarrow MAl(Z)_4 + ½ H_2$
(5) $3Me + AlZ_3 + 3ZH \rightarrow Me_3Al(Z)_6 + 1½ H_2$
(6) $M' + 2AlZ_3 + 2ZH \rightarrow M'[Al(Z)_4]_2 + H_2$
(7) $MZ + Al + 3ZH \rightarrow MAl(Z)_4 + 1½ H_2$
(8) $3MeZ + Al + 3 ZH \rightarrow Me_3Al(Z)_6 + 1½ H_2$
(9) $M'Z_2 + 2Al + 6ZH \rightarrow M'[Al(Z)_4]_2 + 3H_2$ The reactions generally can be carried out under atmospheric, or preferably super-atmospheric pressure in liquid media, excess ZH acting as the solvent or in solvents such as hydrocarbons or ethers, using the metal M, Me or M' and ZH as the limiting reagents. A particularly preferred embodiment of the invention comprises the reaction of the metal, M, Me or M' with aluminum and ZH, in an aprotic solvent, at a temperature between 60° and 200°C, most preferably, 120° to 180°C. and at an initial pressure of $H_2$, $N_2$ or an inert gas such as argon, helium, between 1 and 200 atm. The pressure can be as low as atmospheric or 340 atm., or even higher, although there is no advantage in using higher pressures, e.g. 1,000 psi to economically justify its use.

The reaction usually takes 1 – 5 hours. Temperatures above 180°C. begin to cause slight decompositions and hence the temperature is preferably kept at 160°–180° C.

If it is desired to maintain atmospheric pressure, the hydrogen evolved can be vented. The reaction is exothermic in nature.

Unless otherwise indicated all parts and percentages are by weight.

EXAMPLE 1

Into a stirred autoclave of 2 liter capacity was charged 11.5 grams of sodium (0.50 mol), 17 grams of aluminum powder (0.63 mol) and 700 ml of benzene. The reactor was pressurized with $H_2$ to 6.6 atm. and heated to 60°C. At 60°C 152 grams of 2-methoxyethanol (2.0 mole) was slowly added. The temperature was allowed to rise to 160°C. The pressure in the system after addition exceeded 40 atm. The reaction was carried out over 2 hours. The product as a solution of the $NaAl(OCH_2CH_2OCH_3)_4$ in the benzene was recovered in 98.1 percent of theory. The solution was 20.1 percent in $NaAl(OCH_2CH_2OCH_3)_4$. The product can be recovered as an amorphous solid by removing the benzene by distillation.

EXAMPLE 2

Into the same vessel as described in Example 1 was charged 10 grams of calcium turnings (0.25 mol), 15 grams of aluminum powder (0.56 mol) and 700 ml. of benzene.

The reactor was pressurized to 10 atm with $H_2$ and heated with slow addition of 152 grams of 2-methoxyethanol (2.0 mol) to 180°C. The pressure rose to above 50 atm. The reaction was carried out over four hours. The product, as a solution of $Ca[Al(OCH_2CH_2OCH_3)_4]_2$ in benzene, was recovered in 88.3 percent yield. The solution was found to be 17.4 percent $Ca[Al(OCH_2CH_2OCH_3)_4]_2$. Upon removal of benzene by distillation the product was recovered as an amorphous solid.

EXAMPLE 3

Into the same vessel as described in Example 1 was charged 17.25 grams of sodium (0.75 mole), 8.14 grams of aluminum powder (0.30 mole) and 900 ml. of benzene.

The reactor was purged with $H_2$ and sealed. It was then slowly heated with addition of 118.1 ml. (114 grams; 1.50 mole) of 2-methoxyethanol commencing at 50°C. The addition was completed at 150°C. and the reaction system was then held at 160°C. for 1 hour. The final pressure was 500 psi.

After cooling, the product as a solution of $Na_3Al(OCH_2CH_2OCH_3)_6$ in benzene was recovered in 98.1 percent yield. The solution was found to be 13.6 percent $Na_3Al(OCHCH_2OCH_3)_6$. The $Na_3Al(OCH_2CH_2OCH_3)_6$ isolated by removal of the benzene by distillation was found to be an amorphous solid soluble in all proportions with benzene, hexane, ether, chloroform and THF.

EXAMPLE 4

Into the same vessel as described in Example 1 was charged 5.75 grams of sodium (0.25 mole), 700 grams of aluminum (0.259 mole) and 300 ml. of benzene.

The reactor was purged with $H_2$ and sealed. It was then slowly heated with addition of 97.27 ml. (102.3 grams; 1.0 mole) of tetrahydrofurfuryl alcohol commencing at 52°C. After addition was complete, the system was stirred at 154°C. for 50 minutes, and then cooled. The final pressure at 154°C. was 240 psi. The product was removed as a solution

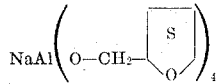

in benzene. Analysis of the benzene solution after partial removal of the benzene gave a solution which was 54.5 percent of

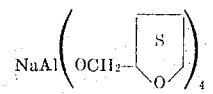

Complete removal of benzene gave the sodium tetra (tetrahydrofurfuryl) aluminate as an amorphous solid.

EXAMPLE 5

Into the same vessel as described in Example 1 was charged 11.5 grams of Na (0.5 moles), 4.86 grams of Al (0.18 mole) and 300 ml. of benzene. The reactor was purged with $H_2$ and sealed under a pressure of 200 psi $H_2$. It was then slowly heated with addition of 100.34 ml. (89 grams; 1 mole) of 2-dimethylaminoethanol commencing at 57°C. After addition was complete, the system was held at 154° – 160°C. for 50 minutes. The final pressure was 495 psi at 155°C. After cooling, the material was recovered in 97.8 percent yield. The recovered weight was 364 grams. On cooling overnight the system partially crystallized. The remaining solution was found to be 19.3 percent $Na_3Al(OCH_2CH_2N(CH_3)_2)_6$ dissolved in benzene. Upon distillation of the benzene the product was recovered as solid.

EXAMPLE 6

In the same vessel as set forth in Example 1 was charged 87.7 grams of sodium (3.81 moles), 37.8 grams of aluminum (1.4 moles), 500 ml. of benzene. The reactor was purged with hydrogen and sealed. It was slowly heated with addition of 885.29 ml. of diethylene glycol monomethyl ether (7.63 moles), commencing at 30°C. After addition was complete (30 minutes) the system was held at 180°C. for 45 minutes. After cooling and venting the material was recovered as a 73.3 percent solution in benzene, recovered yield 94.2 percent as $Na_3Al(OCH_2H_4OC_2H_4OCH_3)_6$. Upon evaporation the compound was recovered as a solid.

The following examples illustrate the use of the present invention as basic catalysts.

EXAMPLE 7

1 mol of methyl benzoate and 1.3 moles of isoamyl alcohol were reacted in 100 cc. of refluxing benzene containing 0.3 equivalent percent (0.001 mol) of $Na_3Al(OCH_2CH_2OCH_3)_6$ to form isoamyl benzoate in an amount of 88.5 percent of its equilibrium yield in 65 minutes.

EXAMPLE 8

Example 7 was repeated replacing the benzene by 100 cc. of refluxing cyclohexane to form isoamyl benzoate in 90.5 percent of the equilibrium yield in 110 minutes.

EXAMPLE 9

Example 7 was repeated replacing the trisodium hexa (methoxyethyl) aluminate by 0.28 equivalent percent (0.0028 mol) of $NaAl(OCH_2CH_2OCH_3)_4$. There was a 66 percent yield of isoamyl benzoate in 165 minutes.

EXAMPLE 10

At a concentration of 0.28 equivalent percent (0.0025 mol) of $NaAl(OCH_2CH_2OCH_3)_4$ there were reacted 1 mol of dimethyl terephthalate with 2.3 moles (an excess) of refluxing n-butanol to obtain an 89 percent yield of dibutyl terephthalate in 60 minutes.

The utility is not limited to transesterification reactions, but instead the compounds of the present invention can be used in any process where a basic catalyst is desired. For example they can be used in anionic polymerization, e.g. in polymerizing methyl methacrylate, hydroxyethyl methacrylate, hexylmethacrylate, in anionic condensation reactions, e.g. ureamalonic ester condensations to form barbiturates.

The compounds of the invention as stated are preferably employed dissolved in organic solvents, most preferably, hydrocarbons. The hydrocarbon solubility lowers the cost of the use of the novel basic compounds compared to conventional alkali metal catalysts.

What is claimed is:

1. A compound having one of the formulae (1) $Me_3Al\ Z_6$ and (2) $M'[Al(Z_4)]_2$ where Me is selected from the group consisting of sodium and potassium, M' is selected from the group consisting of calcium, strontium and barium, Z is selected from the group consisting of $-O(C_nH_{2n}O)_xR$,

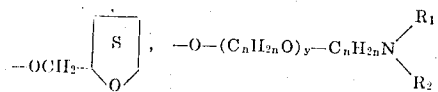

and

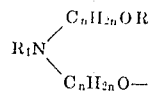

where R is selected from the group consisting of lower alkyl and tetrahydrofurfuryl, $R_1$ and $R_2$ are lower alkyl, n is an integer from 2 to 4, x is an integer from 1 to 4 and y is an integer from 0 to 4.

2. A compound according to claim 1 wherein R is selected from the group consisting of alkyl of one to four carbon atoms and tetrahydrofurfuryl and $R_1$ and $R_2$ are alkyl of one to four carbon atoms.

3. A compound according to claim 2 wherein all the Z groups are the same.

4. A compound according to claim 1 having formula (1).

5. A compound according to claim 4 wherein Me is sodium.

6. A compound according to claim 4 wherein Z is $-O(C_nH_{2n}O)_xR$.

7. A compound according to claim 6 wherein n is 2, x is an integer from 1 to 2 and R is alkyl of one to two carbon atoms.

8. A compound according to claim 6 wherein R is tetrahydrofurfuryl.

9. A compound according to claim 4 where Z is tetrahydrofurfuryloxy.

10. A compound according to claim 4 wherein Z is

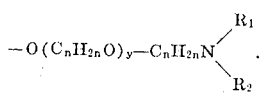

11. A compound according to claim 10 wherein y is 0.

12. A compound according to claim 11 wherein $R_1$ and $R_2$ are alkyl of one to two carbon atoms.

13. A compound according to claim 12 wherein n is 2.

14. A compound according to claim 4 which is trisodium hexa (methoxyethyl) aluminate.

15. A compound according to claim 4 which is trisodium hexa (methoxyethoxyethyl) aluminate.

16. A compound according to claim 4 which is trisodium hexa (dimethylaminoethyl) aluminate.

17. A compound according to claim 1 having formula (2).

18. A compound according to claim 17 wherein M' is calcium.

19. A compound according to claim 17 wherein Z is $-O(C_nH_{2n}O)_x R$.

20. A compound according to claim 19 wherein n is 2, x is an integer from 1 to 2 and R is alkyl of one to two carbon atoms.

21. A compound according to claim 19 wherein R is tetrahydrofurfuryl.

22. A compound according to claim 17 where Z is tetrahydrofurfuryloxy.

23. A compound according to claim 17 wherein Z is

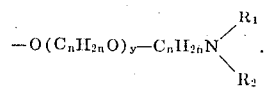

24. A compound according to claim 23 wherein y is 0.

25. A compound according to claim 24 wherein $R_1$ and $R_2$ are alkyl of one to two carbon atoms.

26. A compound according to claim 25 wherein n is 2.

* * * * *